No. 842,898. PATENTED FEB. 5, 1907.
W. T. MADILL.
BAND CUTTER AND FEEDER.
APPLICATION FILED MAR. 14, 1906.

Witnesses.
H. Dennison.
W. C. Muir

Inventor:
W. T. Madill
by E. J. Fetherstonhaugh
Atty.

UNITED STATES PATENT OFFICE.

WILLIAM THOMAS MADILL, OF HIGHFIELD, ONTARIO, CANADA.

BAND-CUTTER AND FEEDER.

No. 842,898.           Specification of Letters Patent.           Patented Feb. 5, 1907.

Application filed March 14, 1906. Serial No. 306,068.

*To all whom it may concern:*

Be it known that I, WILLIAM THOMAS MADILL, of the village of Highfield, county of York, Province of Ontario, in the Dominion of Canada, have invented certain new and useful Improvements in Band-Cutters and Feeders; and I do hereby declare that the following is a full, clear, and exact description of the same.

This invention relates to improvements in band-cutters and feeders as described in the present specification and set forth in the accompanying drawings, that form part of the same.

The invention consists, essentially, of a platform hinged to the frame of a thresher having a rigid top plate, a removable plate interposed between said rigid plate and the cylinder and concaves of the thresher, bars hingedly secured to said platform and removably secured to the thresher-frame, a plurality of longitudinal carriers supported above said rigid top plate, a plurality of circular band-cutters protruding through said plate from the under side and between said longitudinal carriers, a plurality of reciprocating forks supported above said rigid top plate at one end thereof, and means for driving said longitudinal carriers, band-cutters, and forks, as hereinafter described in detail and illustrated in the accompanying drawings.

The objects of the invention are to produce a light and efficient feeder that will effectually carry the sheaves toward the thresher and insure the cutting of the bands and to feed the straw to the cylinder uniformly, to effectually prevent the straw from bunching and choking the cylinder, to provide a device of durable construction, cheap to manufacture, and to render the adjustment of said machine easy for the purpose of transporting it from place to place.

Figure 1:
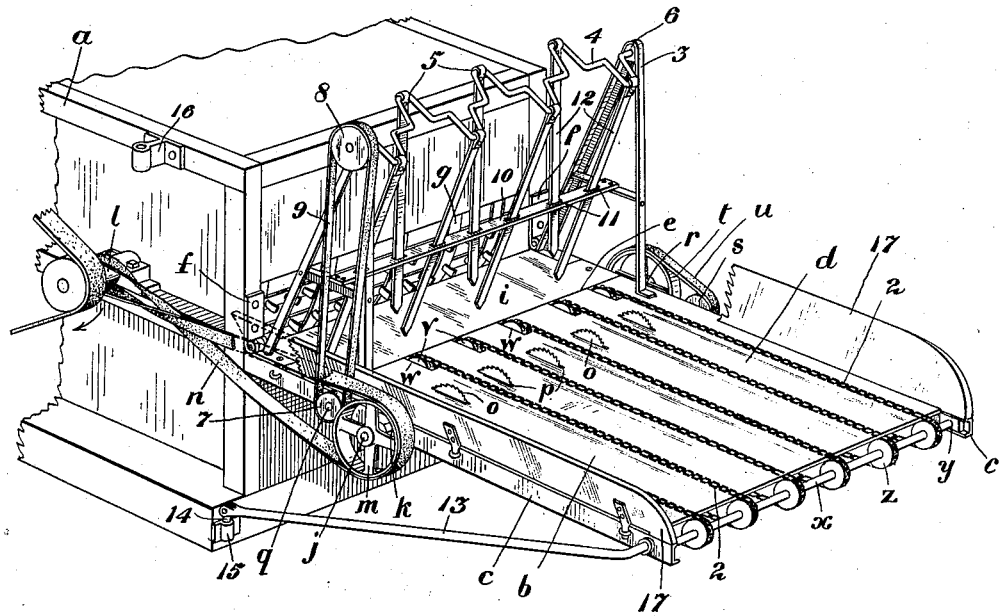
Figure 2:
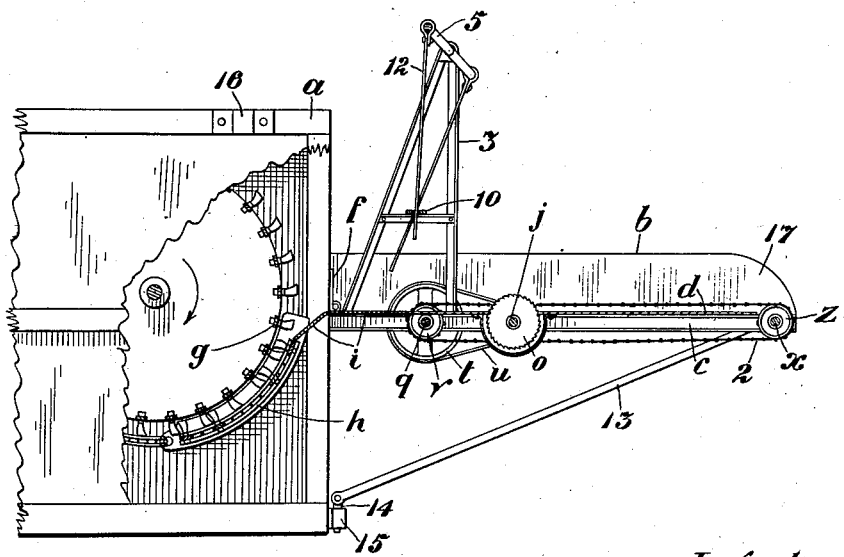

In the drawings, Figure 1 is a perspective view of the feeder attached to the frame of a threshing-machine. Fig. 2 is a longitudinal section of Fig. 1, showing part of the cylinder, concaves, and grates of the thresher.

Like letters or numerals of reference indicate corresponding parts in each figure.

Referring to the drawings, $a$ is the frame of a thresher of any suitable type, to which the swinging platform $b$ is secured. The platform $b$ is preferably of light steel construction, having the side bars $c$ formed of a channel or similar bar, light and strong, and the horizontal plate $d$ suitably secured to the bars $c$ and substantially flush with the upper edges thereof and extending inwardly toward the frame $a$ of the thresher and terminating in proximity thereto at $e$. The bars $c$ are secured to the uprights of the frame $a$ of the thresher by the hinges $f$. The hinges $f$ allow the platform $b$ to be swung in an upward direction, so that when it is desired to move the thresher the feeder-platform may be raised out of the way of the horses.

$g$ is the thresher-cylinder, located within the frame $a$ and journaled in suitable bearings. $h$ represents the concaves, also located in the frame of the thresher.

$i$ is a plate bridging the distance between the plate $d$ and the concaves $h$ and is removable at will, thus forming a positive guide for the straw which is being fed into contact with the cylinder.

$j$ is a shaft extending across the feeder-platform $b$ underneath the plate $d$ and is journaled in the bearings $k$, secured to the side bars $c$.

$l$ is a pulley secured on the shaft of the thresher-drum $g$ outside of the frame $a$, and $m$ is a pulley secured to one end of the shaft $j$ in line with the pulley $l$. The pulley $m$ is preferably of a considerably larger diameter than the pulley $l$, and consequently the shaft $k$ will not rotate at as great a speed as the cylinder-shaft.

$n$ is a belt engaging the pulleys $l$ and $m$ and is crossed, as shown, to cause the shaft $j$ to revolve in a reverse direction to the shaft of the drum $g$.

$o$ represents small circular knives fixedly secured to the shaft $j$ at regular intervals and protrude upwardly through the longitudinal slots $p$ in the plate $d$.

$q$ is a shaft extending across the platform $b$ and is suitably journaled in the bearings $r$ in the bars $c$. The shaft $q$ is located between the shaft $j$ and the end of the thresher.

$s$ is a pulley on the shaft $j$, fixedly secured thereto at the end opposite the pulley $m$, and $t$ is a pulley on the end of the shaft $q$ in line with the pulley $s$, preferably of a larger diameter than the pulley $s$. The pulleys $s$ and $t$ are connected by a belt $u$ and are of different diameter in order to run the shaft $q$ slower than the shaft $j$.

$v$ represents chain-sprockets fixedly secured at regular intervals on the shaft $q$ and protruding upwardly through openings $w$ in the plate $d$.

*x* is a shaft located near the outermost end of the platform *b* and journaled in the bearings *y* in the bars *c*. The shaft *x* has fixedly secured thereto sprocket-wheels *z*, corresponding to the sprocket-wheels *v* on the shaft *g* and arranged, preferably, in alinement with the same.

2 represents endless sprocket-chains forming carrier-belts and running upon the sprockets *v* and *z*, the upper portion passing longitudinally over the plate *d* and the under portion below the said plate.

The cylinder *g* turns in the direction indicated by the arrow and through the cross-belt *n* rotates the pulley *m* in the opposite direction, consequently rotating the saws *o* and the sprockets *w* in the direction toward the thresher. This causes the upper or carrying portions of the chains 2 to always travel inwardly toward the thresher, and therefore to carry the sheaves placed thereon in that direction. The sheaves are thrown upon the carrier-chains and as they pass the revolving saws *o* the bands are cut and the broken sheaves are passed onward toward the plate *i*.

3 represents uprights preferably of triangular formation and constructed of light steel work and fixedly secured to the upper face of the platform *b* at each side thereof.

4 is a crank-shaft formed with a plurality of cranks 5 and journaled at its outermost ends in the journal-bearings 6, located at the upper end of the uprights 3.

7 is a pulley secured to the end of the shaft *q* outside of the bars *c* and at the end opposite to the pulley *t*, and 8 is a pulley, preferably of a larger diameter than the pulley 7, secured to one end of the crank-shaft 4 and in alinement with the pulley 7. The pulleys 7 and 8 are connected together by a suitable belt 9, and the shaft *q* rotates the crank-shaft 4 through the said belt connection.

10 is a bar suspended above the platform *b* between the uprights 3 and is provided with slots 11 in alinement with the cranks 5 of the crank-shaft 4.

12 represents forks pivoted on the cranks 5 of the crank-shaft 4 and extending through the slots 11. The lower ends of the forks 12 are pointed or formed in any suitable manner to effectually dig into and catch the straw. As the crank-shaft 4 turns the forks 12 are operated thereby; but the cross-bar 10 limits the movement of the said forks and causes the lower extending ends thereof to move in an almost direct reciprocatory motion. The movement of the said forks governs the feed of the straw, effectually preventing the suction of the cylinder from carrying in any large quantities of the straw at once and choking the mechanism of the thresher.

13 represents arms pivotally secured near the outer ends of the bars *c* and formed at their other end with a swinging pin 14 to engage and rest in brackets 15 on the frame of the thresher. The bars 13 when in the position shown support the outer end of the feeder-platform *b*, and when it is desired to raise the platform out of the way of the horses the bars are withdrawn from their retaining-brackets and the platfrom swung upward and the pins 14 hooked into the retaining-brackets 16, located on the upper part of the frame.

17 represents guard-boards located on the sides of the platform to prevent the sheaves from rolling off or becoming entangled in the belting of the feeder.

A feeder for threshers such as described is very easily operated and effectual in its work. The carrier-chains run longitudinally and travel slightly above the platform, allowing the sheaves to drop partially between them, thus permitting the chains to get a firm hold on the sheaves, and as the band-cutters *o* are arranged between each pair of carriers the band of the sheaf must come in contact with the revolving knives and be severed. The sheaves also slip freely over the plate *d*, which is perfectly smooth, and offers no obstruction or resistance to the forward travel of the sheaves, and as the platform and plate are stationary and are free from vibratory movement the grain is not jostled and partly threshed out before being delivered from the carrier.

The sheaves are carried forward by the carrier-chains and delivered to a position where the feeding-forks 12 will quickly catch in the straw and push it forward until caught by the revolving cylinder of the separator. At the same time the straw will be held from being pulled into the separator in bunches or too fast, as there are at all times some portions of the forks 12 in engagement with the straw.

A feeder for threshers or separators such as described may be made of very light and rigid construction, at the same time be durable and cheap to manufacture, and as there are no delicate parts or delicate adjustments it may be quickly and easily repaired without having to be sent to the factory.

What I claim as my invention is—

1. In a band-cutter and feeder, the combination with the frame, cylinder and driving mechanism of a threshing-machine, of a platform hinged to the frame of the thresher having a rigid top plate, a removable plate extending from said rigid plate to the concaves of the thresher, supporting arms hingedly secured to the outer end of said platform and removably secured to the frame of the thresher, a plurality of shafts journaled below said rigid top plate, a plurality of endless chain carriers supported and driven from said shafts having the upper portion thereof arranged above said top plate, a plurality of circular band-cutters mounted on another of said shafts and arranged intermediately between each pair of carriers, a pair of standards at the inner end of said platform and arranged to the sides thereof, a crank-shaft journaled on said standards having a plurality of cranks, each alternate crank being set diametrically opposite, a plurality of forks journaled at the upper ends on said cranks, a guide for said forks arranged intermediate of the height of said standards, and means for driving said crank-shaft, band-cutters and endless carriers, as and for the purpose specified.

2. In a band-cutter and feeder, the combination with the frame, cylinder and driving mechanism of a threshing-machine of a platform hinged thereto and extending laterally therefrom and having a pair of side bars and a rigid top plate said plate having a plurality of openings therethrough, a removable plate bridging the distance from the aforesaid plate into the machine, hinged bars secured to said frame and said platform and supporting the latter, means attached to said frame for engaging said bars, bearings supported by said side bars, shafts journaled in said bearings and extending across said platform under said plate, a plurality of sprocket-wheels mounted on said shafts, and extending through said openings, a plurality of chain carriers on said sprockets, a plurality of band-cutters mounted on another of said shafts and protruding through said openings between the aforesaid carriers, means for governing the feed into said machine between said carriers and the machine, means for operating said governing means, and means for driving the aforesaid carriers and band-cutters, as and for the purpose specified.

3. In a band-cutter and feeder, the combination with the frame, cylinder and driving mechanism of a threshing-machine of a platform hinged thereto and extending laterally therefrom and having a pair of side bars and a rigid top plate said plate having a plurality of openings therethrough, a removable plate bridging the distance from the aforesaid plate into the machine, hinged bars secured to said frame and said platform and supporting the latter, means attached to said frame for engaging said bars, bearings supported by said side bars, shafts journaled in said bearings and extending across said platform under said plate, a plurality of sprocket-wheels mounted on said shafts and extending through said openings, a plurality of chain carriers on said sprockets, circular cutters mounted on another of said shafts and extending through said openings between the aforesaid carriers, a pair of uprights rising from said platform at each side thereof in proximity to the frame of the machine, bearings supported thereby at the top end thereof, a crank-shaft having a plurality of cranks and journaled in said bearings, a plurality of forks journaled on the aforesaid cranks, a guide-bar extending between the said uprights intermediate of their length having slots in which said forks slide, and suitable pulleys mounted on said shafts connected by suitable belting and connected with said driving mechanism, as and for the purpose specified.

Signed at Toronto this 15th day of February, 1906.

WILLIAM THOMAS MADILL.

Witnesses:
H. DENNISON,
WM. C. MUIR.